July 8, 1952 — H. J. EARL — 2,602,490
HORIZONTALLY MOVABLE FOOTREST
Filed April 14, 1949 — 3 Sheets-Sheet 1

INVENTOR.
Harley J. Earl,
BY Robert R. Lockwood
Atty

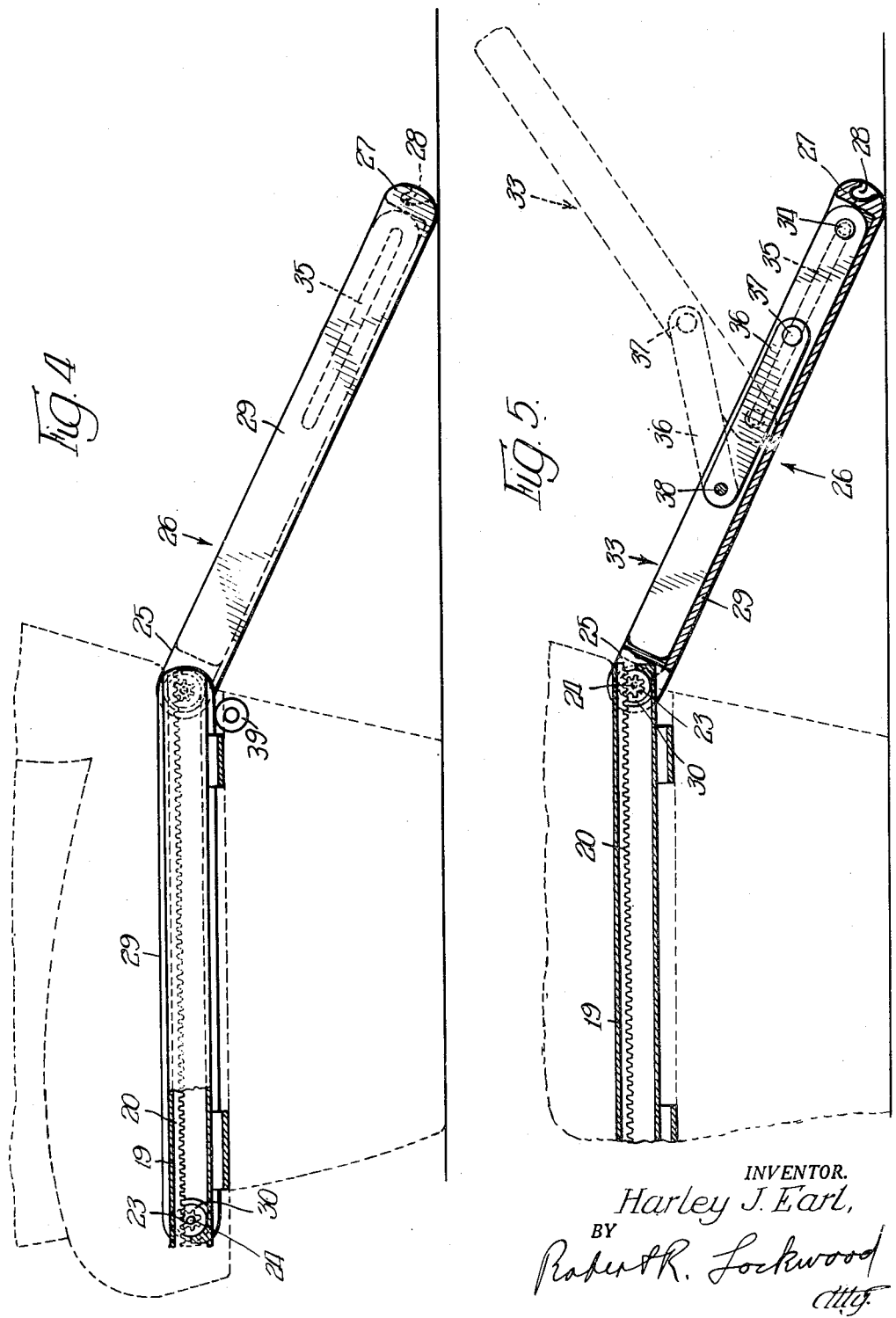

July 8, 1952
H. J. EARL
2,602,490
HORIZONTALLY MOVABLE FOOTREST
Filed April 14, 1949
3 Sheets-Sheet 3
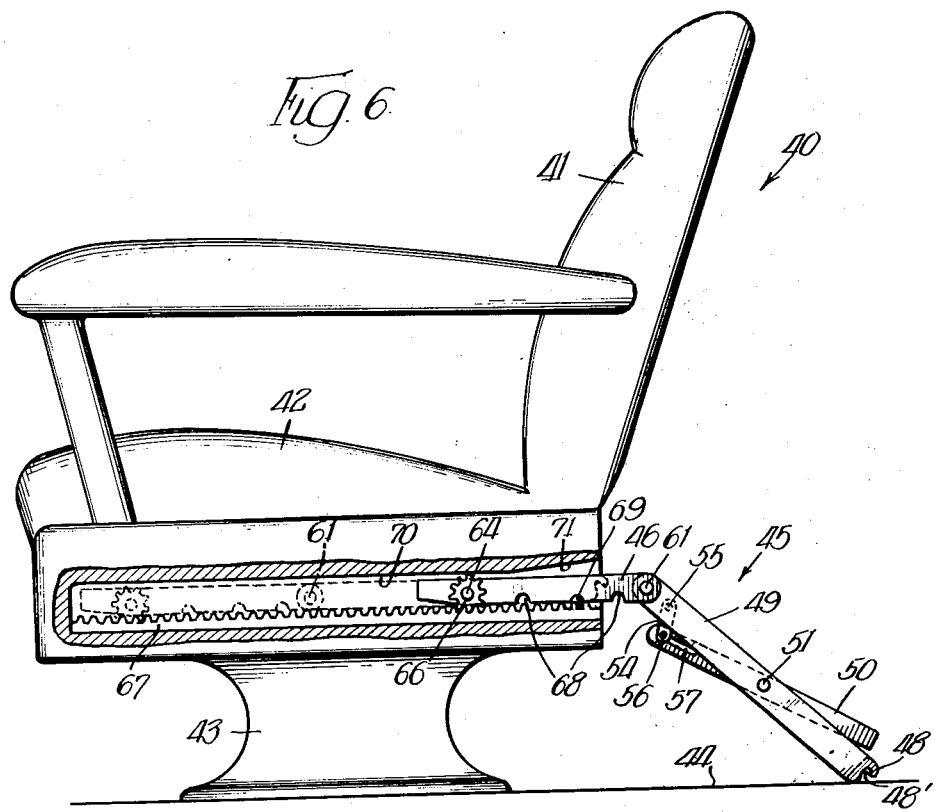
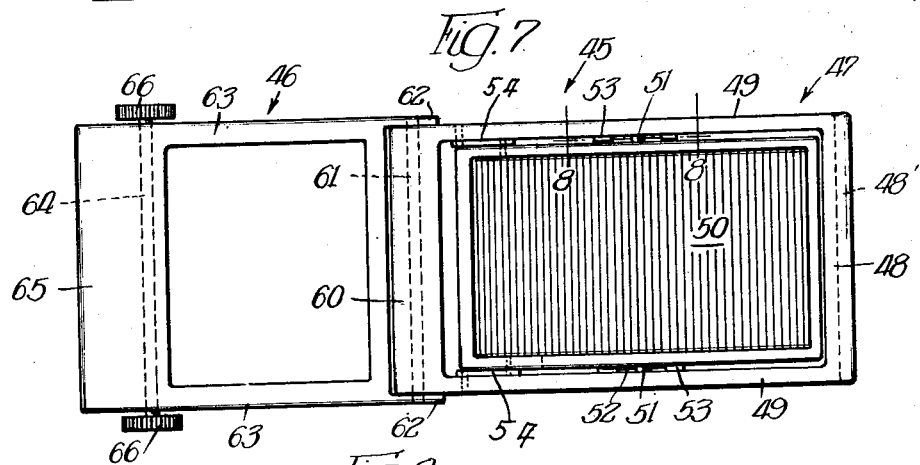
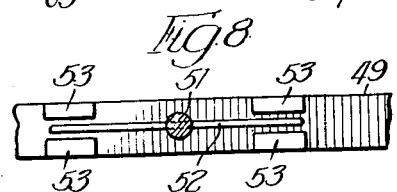
INVENTOR.
Harley J. Earl,
BY Robert R. Lockwood Patented July 8, 1952

2,602,490

UNITED STATES PATENT OFFICE 2,602,490

HORIZONTALLY MOVABLE FOOTREST

Harley J. Earl, Detroit, Mich., assignor to Ajax-Consolidated Company, Chicago, Ill., a corporation of Illinois Application April 14, 1949, Serial No. 87,528

7 Claims. (Cl. 155—170)

This invention relates, generally, to foot rests for passenger car seats, and it has particular relation to retractable combination foot and leg rests therefor.

Among the objects of this invention are: To provide for moving a retractable foot rest underneath a car seat without cocking; to construct the rest so that it can be used either as a foot rest or as a leg rest; to mount the rest so that it can be withdrawn from underneath a car seat by a person sitting in the next seat behind; to limit the movement of the rest relative to the frame carrying the same; and to center the rest with respect to the frame.

Other objects of this invention will, in part, be obvious and in part appear hereinafter.

This invention is disclosed in the embodiments thereof shown in the accompanying drawings and it comprises the features of construction, combination of elements, and arrangement of parts which will be exemplified in the constructions hereinafter set forth and the scope of the application of which will be indicated in the appended claims.

For a more complete understanding of the nature and scope of this invention, reference can be had to the following detailed description, taken together with the accompanying drawings, in which:

Figure 4 is a view, partly in side elevation and partly in section, showing the present invention withdrawn from the seat and serving as a foot rest;

Figure 5 is a view similar to Figure 4 but showing by broken lines how the present invention can be employed as a leg rest;

Figure 6 is a view, in side elevation, of a passenger car seat in which a modified form of the invention is incorporated;

Figure 7 is a top plan view of the retractable foot rest mechanism shown in Figure 6; and Figure 8 is a detail sectional view taken along the line 8—8 of Figure 7.

Figure 1:
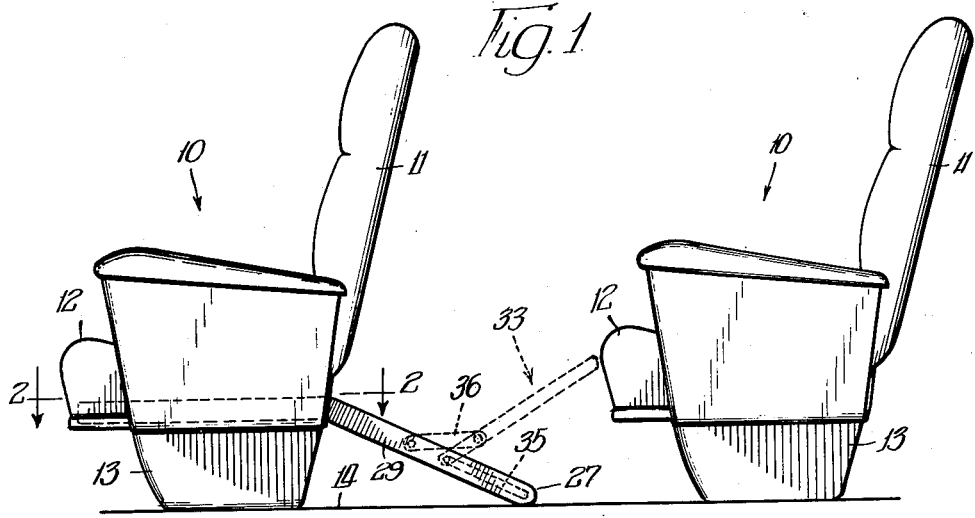
Figure 1 is a view in side elevation of a conventional passenger car seat with which the present invention is incorporated.

Referring now particularly to Figure 1 of the drawings, it will be observed that the reference character 10 designates, generally, a conventional passenger car seat having a back cushion 11 and a bottom cushion 12. The seat 10 includes a support 13 for mounting the same on the floor 14.

Figure 2:
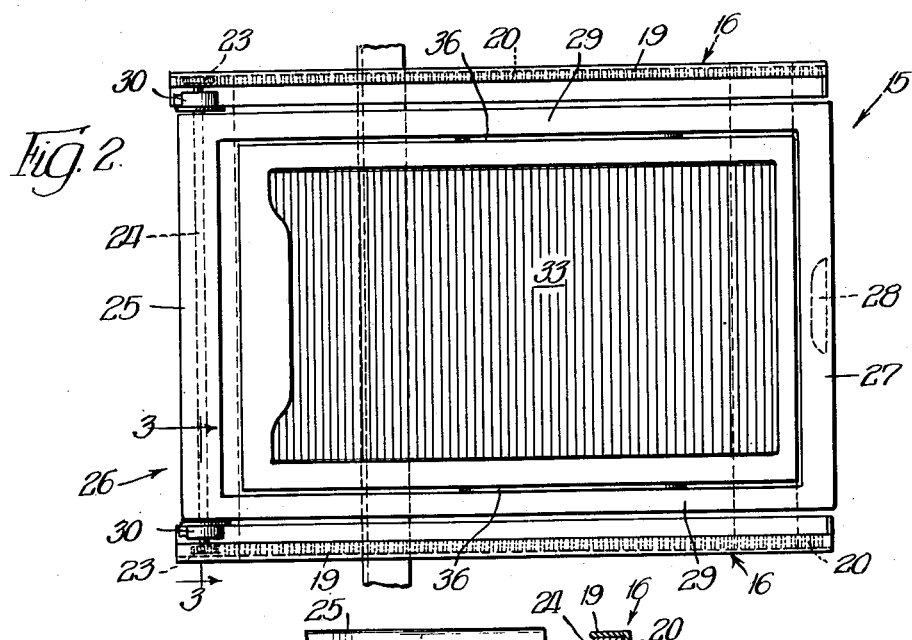
Figure 2 is a top plan view of the retractable combination foot and leg rest in the retracted position and taken generally along the line 2—2 of Figure 1.
Figure 3:
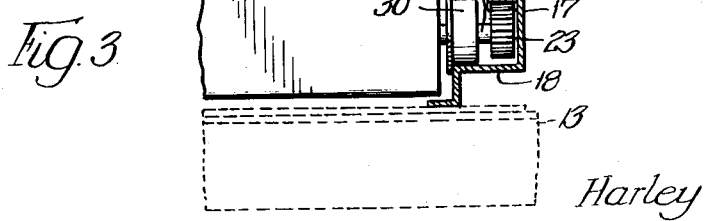
Figure 3 is a detail sectional view taken generally along the line 3—3 of Figure 2.

In Figure 2 of the drawings there is illustrated, generally, at 15 a combination foot and leg rest which is incorporated in the seat 10 and is located underneath the bottom cushion 12. It includes a pair of transversely extending channels 16 which are parallel to each other and open toward each other. Each channel 16, as shown in Figure 3, includes a vertical intermediate section 17, a lower flange 18 and a narrower upper flange 19. A rack 20 is secured to the underside of the upper flange 19.

Pinions 23 are arranged to engage the teeth of the rack 20 and they are fast on the ends of a shaft 24 which is journaled in the forward end 25 of a generally rectangular frame that is indicated at 26. The frame 26 may be formed of metal such as cast aluminum. It will be understood that the frame 26 is arranged to be withdrawn to the rear of the seat 10 by the occupant of the seat immediately behind it. It is to prevent the cocking of the frame 26 that the pinions 23 fast on the shaft 24 are provided together with the racks 20. Since there is a positive connection between the pinions 23, cocking of the frame 26 between the channels 16 is avoided as it is moved to and fro with a translatory movement. When the frame 26 is withdrawn, as illustrated in Figure 1, its rear end 27 is arranged to bear against the floor 14. A hand hold 28 is provided in the rear end 27 to facilitate the gripping of the frame 26 by the occupant of the next seat.

The frame 26 has longitudinally extending sides 29 which join the forward and rear ends 25 and 27, as illustrated. With a view to holding the pinions 23 in operative engagement with the teeth of the racks 20 and to facilitate translatory movement of the frame 26, flanged wheels 30 are rotatably mounted on the shaft 24 between the pinions 23 and the sides 29. As illustrated in Figure 3 the flanged wheels 30 are arranged to run along the upper surface of the lower flange 18 and thus serve to hold the shaft 24 spaced therefrom with the pinions 23 in operative engagement with the teeth of the racks 20.

Movably mounted within the frame 26 is a generally rectangular foot and leg rest that is indicated, generally, at 33. The side of the rest 33 illustrated in Figure 2 of the drawings may be ribbed and may be formed of plastic or rubber since it is arranged to have the feet of the person placed thereon. The other side of the rest 33 preferably is covered with the same material that covers the cushions 11 and 12 since the legs of the person will rest against the same.

As illustrated in Figure 5 pins 34 project laterally from the sides of the rest 33 near the rear end thereof and they extend into longitudinal slots 35 that are formed on the inside of the sides 29 of the frame 26. Also as shown in Figure 5 a pair of links 36 interconnect the rest 33 and the frame 26. It will be noted that the links 36 are pivoted at 37 to the rest 33 and that they are pivoted at 38 to the sides 29 of the frame 26. It will be understood that the pins 34 and slots 35 together with the links 36 serve to guide the rest 33 from a position flush with or in register with the frame 26, as illustrated in Figure 4, to the alternate position where it is inclined with respect to the frame 26 as shown in Figure 5.

Rollers 39, Figure 4, may be provided at the rear end of each channel 16 to support the sides of the frame 26 in its movement from and to its retracted position.

In operation it will be understood that the person in the seat immediately to the rear of the seat 10 shown in Figure 1 can withdraw the frame 26 from its retracted position underneath the bottom cushion 12 by grasping the hand hold 28. After it is withdrawn the full extent, it is released and the rear end 27 is supported by the floor 14. If it is desired to use the device as a foot rest then no further manipulation is necessary. However, if it is desired to use the device as a leg rest, then the forward end of the rest 33 is grasped and it is swung to the position shown by the broken lines in Figures 1 and 5 of the drawings. By reversing these movements the device is restored to the fully retracted position.

In Figures 6, 7, and 8 another embodiment of the invention is illustrated. As there shown the reference character 40 designates, generally, a conventional seat having a back cushion 41 and a bottom cushion 42. The seat 40 is supported by a seat support 43 on a floor 44.

Mounted for translatory movement underneath the bottom cushion 42 is an articulated frame that is indicated, generally, at 45. The frame 45 includes a forward section, shown generally at 46, and a rear section, shown generally at 47. The rear end 48 of the section 47 has a hand hold 48' to facilitate withdrawal of the frame 45 from underneath the bottom cushion 42.

Between the sides 49 of the rear section 47 a generally rectangular foot rest 50 is pivotally mounted at 51. It will be understood that the feet of the person occupying the seat behind the seat 40, Figure 6, can be placed on the foot rest 50 when it occupies the position shown here.

In order to center the foot rest 50 with respect to the rear section 47 of the frame 45, a spring wire 52 may be arranged to extend through each of the pivots 51 as illustrated more clearly in Figure 8. Stops 53 carried by the sides 59 serve to limit the movement of the ends of the spring wires 52 while the resiliency of the spring wires 52 permits some relative movement between the foot rest 50 and the rear section 47 as illustrated in Figure 6. A link 54 is pivoted at 55 on the rear section 47 in order to limit the rocking movement of the foot rest 50. It will be observed that the other end of the link 54 has a pin 56 which is arranged to slide in a slot 57 in the foot rest 50.

The front end 60 of the rear section 47 has a shaft 61 extending therethrough and its ends project into ears 62 which constitute extensions of sides 63 of the forward section 46. This construction permits the rear section 47 of the articulated frame 45 to swing downwardly with respect thereto as illustrated in Figure 6.

A shaft 64 extends transversely of the forward section 46 and is journaled in the front end 65 thereof. Pinions 66 are fast on the ends of the shaft 64 and they are arranged to engage the teeth of racks 67 which extend transversely of the seat 40 underneath the bottom cushion 42.

With a view to adjusting the position of the foot rest 50 for individuals of different height, slots 68 are provided on the underside of the sides 63 and they are arranged to cooperate with detents 69 that project upwardly as illustrated in Figure 6.

In order to hold the pinions 66 in operative engagement with the teeth of the rack 67, a guide member 70 is provided immediately thereabove. The under surface of the guide member 70 is inclined upwardly as indicated at 71 in Figure 6 in order to permit the forward section 46 of the articulated frame 45 to be swung upwardly slightly to permit the desired positioning of the slots 68 with respect to the detents 69.

Since certain further changes can be made in the foregoing constructions and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. A retractable combination foot and leg rest for seats in railway cars, motor coaches and the like comprising, in combination, a rectangular frame mounted for translatory rearward movement underneath said seat, the forward end of said frame being pivoted on said seat and its rear end resting on the floor when it is withdrawn from underneath said seat, a generally rectangular foot and leg rest within said frame, and hinge means interconnecting said frame and rest whereby the latter is held in an inclined position relative to the former to function as a leg rest for the person seated in the next seat behind when said frame is withdrawn as aforesaid and may be swung into register with the former to function as a foot rest for said person.

2. A retractable combination foot and leg rest for seats in railway cars, motor coaches and the like comprising, in combination, a rectangular frame mounted for translatory rearward movement underneath said seat, the forward end of said frame being pivoted on said seat and its rear end resting on the floor when it is withdrawn from underneath said seat, a generally rectangular foot and leg rest within said frame, pin and slot means in said frame and rest interconnecting the same, and a pair of links pivoted to opposite sides of said rest and to the sides of said frame intermediate their ends for holding said rest in an inclined position relative to said frame to function as leg rest for the person seated in the next seat behind when said frame is withdrawn as aforesaid, said rest when swung into register with said frame functioning as a foot rest for said person.

3. A retractable combination foot and leg rest for seats in railway cars, motor coaches and the like comprising, in combination, a rectangular frame mounted for translatory rearward movement underneath said seat and having longitudinal slots in its inner sides near the rear end, the forward end of said frame being pivoted on said seat and its rear end resting on the floor when it is withdrawn from underneath said seat, a generally rectangular foot and leg rest within said frame, a pin projecting laterally from each side of said rest near the rear end into the adjacent longitudinal slot in said frame, and a pair of links pivoted to opposite sides of said rest and to the sides of said frame intermediate their ends for holding said rest in an inclined position relative to said frame to function as a leg rest for the person seated in the next seat behind when said frame is withdrawn as aforesaid, said rest when swung into register with said frame functioning as a foot rest for said person.

4. A retractable combination foot and leg rest for seats in railway cars, motor coaches and the like comprising, in combination, a pair of parallel spaced channels disposed transversely underneath a seat and opening toward each other, a rack extending along the underside of the upper flange of each channel, a rectangular frame for rearward movement underneath said seat between said channels having longitudinal slots in its inner sides at the rear end, a shaft extending transversely of and journaled on the forward end of said frame, a pinion fast on each end of said shaft for engaging the rack along each side of said frame to prevent cocking during movement thereof, a flanged wheel rotatable on each end of said shaft between the pinion and frame and engaging the upper side of the under flange of each channel to facilitate movement of said frame and acting to hold said pinions in engagement with said racks, a generally rectangular foot and leg rest within said frame, a pin projecting laterally from each side of said rest near the rear end into the adjacent longitudinal slot in said frame, and a pair of links pivoted to opposite sides of said rest and to the sides of said frame intermediate their ends for holding said rest in an inclined position relative to said frame in conjunction with said pins and slots so as to function as a leg rest for the person seated in the next seat behind when said frame is withdrawn to the rear from underneath the first mentioned seat and its rear end rests on the floor, said rest when swung into register with said frame functioning as a foot rest for said person.

5. A retractable foot rest for seats in railway cars, motor coaches and the like comprising, in combination, a pair of parallel spaced racks disposed transversely underneath a seat, a rectangular articulated frame for rearward movement underneath said seat between said racks, a shaft extending transversely of and journaled on the forward end of the front section of said frame, a pinion fast on each end of said shaft for engaging the rack along each side of said frame to prevent cocking during movement thereof, a foot rest pivoted on the rear section of said frame on which the feet of a person seated in the next seat behind can be placed when said frame is withdrawn to the rear from underneath the first mentioned seat and the rear end of said rear frame section rests on the floor, and a link interconnecting said rear frame section and said foot rest for limiting their relative movement.

6. A retractable foot rest for seats in railway cars, motor coaches and the like comprising, in combination, a pair of parallel spaced racks disposed transversely underneath a seat, a rectangular articulated frame for rearward movement underneath said seat between said racks, a shaft extending transversely of and journaled on the forward end of the front section of said frame, a pinion fast on each end of said shaft for engaging the rack along each side of said frame to prevent cocking during movement thereof, a foot rest pivoted on the rear section of said frame on which the feet of a person seated in the next seat behind can be placed when said frame is withdrawn to the rear from underneath the first mentioned seat and the rear end of said rear frame section rests on the floor, and spring means interposed between said rear frame section and said foot rest to bias the latter to a central position with respect to the former.

7. A retractable foot rest for seats in railway cars, motor coaches and the like comprising, in combination, a pair of parallel spaced racks disposed transversely underneath a seat, a rectangular articulated frame for rearward movement underneath said seat between said racks, a shaft extending transversely of and journaled on the forward end of the front section of said frame, a pinion fast on each end of said shaft for engaging the rack along each side of said frame to prevent cocking during movement thereof, a foot rest pivoted on the rear section of said frame on which the feet of a person seated in the next seat behind can be placed when said frame is withdrawn to the rear from underneath the first mentioned seat and the rear end of said rear frame section rests on the floor, spring means interposed between said rear frame section and said foot rest to bias the latter to a central position with respect to the former, and a link interconnecting said rear frame section and said foot rest for limiting their relative movement.

HARLEY J. EARL.

REFERENCES CITED

The following references are of record in the file of this patent:

UNITED STATES PATENTS

| Number | Name | Date |
|---|---|---|
| 293,833 | Winchester | Feb. 19, 1884 |
| 371,373 | Scarritt | Oct. 11, 1887 |
| 513,169 | Armstrong | Jan. 23, 1894 |
| 2,458,483 | Bell | Jan. 4, 1949 |
| 2,481,970 | Bell | Sept. 13, 1949 |
| 2,484,803 | Bell | Oct. 18, 1949 |